(12) United States Patent
Keshavaraj

(10) Patent No.: US 7,736,702 B1
(45) Date of Patent: Jun. 15, 2010

(54) METHOD OF MAKING A COATED AIRBAG

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 12/589,222

(22) Filed: Oct. 20, 2009

Related U.S. Application Data

(62) Division of application No. 12/388,934, filed on Feb. 19, 2009.

(51) Int. Cl.
*B05D 3/02* (2006.01)
(52) U.S. Cl. .................................. 427/389.9
(58) Field of Classification Search ............... 427/389.9, 427/387, 412
See application file for complete search history.

(56) References Cited

U.S. PATENT DOCUMENTS

| | | | |
|---|---|---|---|
| 6,169,043 B1 | 1/2001 | Li | |
| 6,169,365 B1 | 1/2001 | Kubon et al. | |
| 6,177,365 B1 | 1/2001 | Li | |
| 6,177,366 B1 | 1/2001 | Li | |
| 6,239,046 B1 | 5/2001 | Veiga et al. | |
| 6,348,543 B1 | 2/2002 | Parker | |
| 6,468,929 B2 | 10/2002 | Parker | |
| 6,545,092 B2 | 4/2003 | Parker | |
| 6,630,220 B1 | 10/2003 | Veiga | |
| 6,641,686 B1 | 11/2003 | Veiga et al. | |
| 6,734,123 B2 | 5/2004 | Veiga et al. | |
| 6,770,578 B2 | 8/2004 | Veiga | |
| 6,846,004 B2 | 1/2005 | Parker | |
| 7,543,843 B2 | 6/2009 | Keshavaraj et al. | |
| 2005/0100692 A1 | 5/2005 | Parker | |
| 2009/0186543 A1 | 7/2009 | Keshavaraj et al. | |

*Primary Examiner*—Arti Singh-Pandey
(74) *Attorney, Agent, or Firm*—Cheryl J. Brickey

(57) ABSTRACT

Coating compositions, which are used as a monolithic coating layer for airbags. The coating compositions include a combination of urethanes which are blended together. At least one of the urethane components provides gas-retaining properties and the other provides the aging stability. The gas-retaining urethane may be characterized as having high tensile strength at break, high elongation at break, and a 100% modulus less than 1,200 psi. The aging stability urethane has a polycarbonate backbone as result of a manufacturing process in which a polycarbonate diol is reacted with an isocyanate. The resulting coating compositions, when applied as a single layer to an airbag fabric, result in an airbag with good gas retention and aging stability.

6 Claims, 1 Drawing Sheet

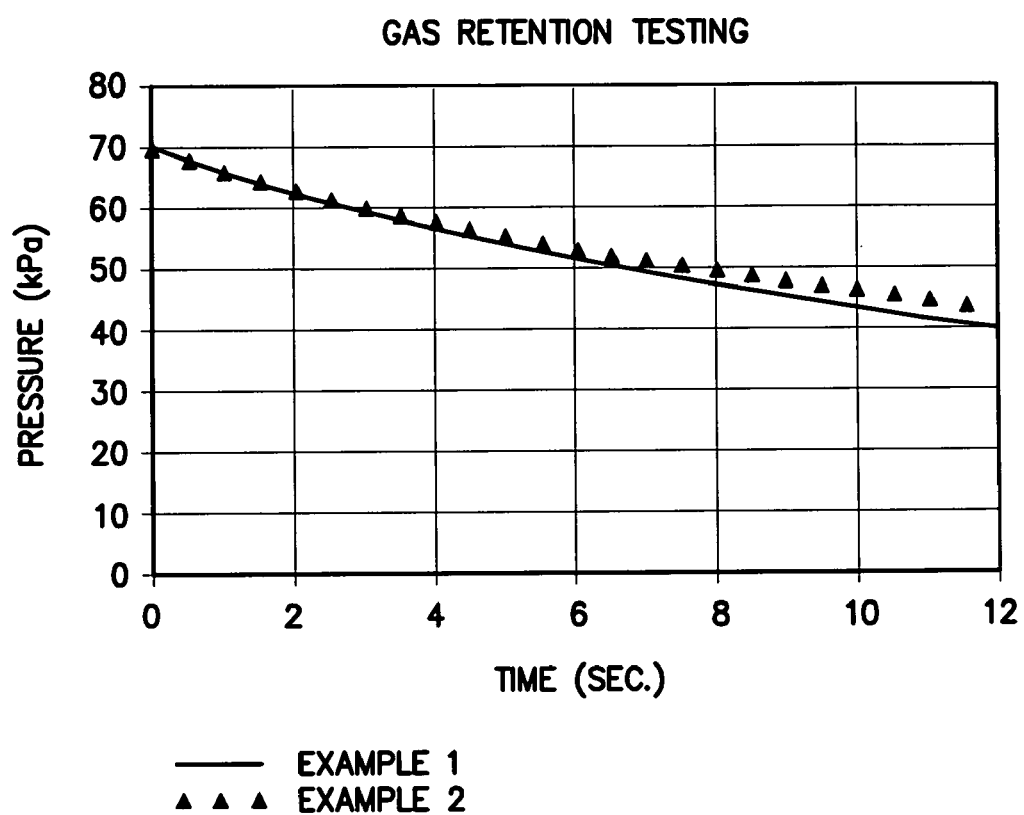
FIG. -1-

METHOD OF MAKING A COATED AIRBAG

CROSS-REFERENCE TO RELATED PATENT APPLICATIONS

This application is a divisional of co-pending U.S. patent application Ser. No. 12/388,934, filed on Feb. 19, 2009, the disclosure of which is hereby incorporated by reference.

TECHNICAL FIELD

The present disclosure relates to the use of a monolithic coating for airbag fabrics. The flame retardant coating composition imparts desired properties to the airbag, such as gas retention, flame retardance, and aging stability which are comparable to properties achieved in the past using multiple coating layers. The coating composition incorporates a blend of at least two different urethanes. The first urethane in the blend functions as a gas-retaining urethane compound. The second urethane is a softer 100% polycarbonate polyurethane which functions as an aging stability urethane compound. The primary advantage of the present coating composition is that, even when used as a single layer, it achieves the desired properties of a two layer coating system.

BACKGROUND

Historically, airbags have been coated with one or more layers of polymeric material to enhance their performance, for example, by preventing the unwanted permeation of air through the fabric and, to a lesser extent, by protecting the fabric from detriment due to exposure to hot gases used to inflate the airbags. Polychloroprene was the polymer of choice in the early development of coated airbags. Subsequently, polychloroprene was almost universally replaced by silicone-based materials.

Newer designs for airbags, particularly those being placed in the sides of passenger compartments, have introduced the requirement that the bags hold pressure longer under use. The requirement of longer air retention times and the use of lower coating levels of silicone polymer have highlighted the effect that a naturally lubricating silicone coating may allow the yarns in the airbag fabric to shift when a sewn seam is stressed. This shifting may lead to leakage of the inflating gas through pores formed from the shifting yarns.

In the past, extended pressure retention times have been achieved by applying a first layer of gas-retaining polymer (such as a silicone-containing polymer) to the fabric surface and then applying a second, protective layer over the first layer. The second, protective layer prevents the airbag coating from sticking to itself when folded and stored (a condition known as "blocking") and also protects the first, gas-retaining layer from damage due to aging, abrasion, and the like. In most situations, the second layer also helps to minimize the burn rate of the airbag to satisfy burn test requirements as mandated by Federal Motor Vehicle Safety Standard (FMVSS) 302.

Various coating systems have been advocated combining silicone with different polymers in the same polymer network. By way of example, such silicone-based coating systems are described in U.S. Pat. Nos. 6,348,543; 6,468,929; 6,545,092; 6,846,004; and U.S. Patent Application Publication No. 2005-0100692 all to Parker and all of which are hereby incorporated by reference as if fully set forth herein.

Various multi-layered coating systems have also been advocated. In this regard, exemplary multi-layer systems are set forth in U.S. Pat. Nos. 6,239,046; 6,641,686; 6,734,123; and 6,770,578 all to Veiga and 6,177,365 and 6,177,366 to Li all of which are hereby incorporated by reference as if fully set forth herein.

Airbag manufacturers have used these and other solutions to address the multiple problems associated with forming a suitable coating composition. Specifically, the airbag coating is required to provide the necessary gas retention properties to the airbag. It is also desirable that the coating impart flame retardance to the airbag. In this regard, flame retardance has typically been achieved by incorporating flame retardant additives into the top layer(s) of a multi-layered coating, since the incorporation of flame retardant additives into the fabric-contacting layer may impair gas retention. Another desirable characteristic is the avoidance of so called "blocking" in which the coating compositions tend to stick to themselves when the bags are folded and stored over long periods of time. Finally, another desirable feature is the need for the airbag coating to be stable to aging, meaning that the coating will not degrade over time and in extreme conditions of heat and/or humidity.

As best understood, single coating layers have been generally deficient in meeting these various problems. Thus, the use of multi-layered coatings has gained relatively broad acceptance. The urethane-based coating composition of the present disclosure may be used as a monolithic coating layer for airbags with performance characteristics comparable to those of the prior multi-layered coatings. Accordingly, the disclosure provides a useful advancement over the prior art.

SUMMARY

The present disclosure offers advantages and alternatives over the known art by providing coating compositions which may be used as a monolithic coating layer for airbags. Preferably, these coating compositions include at least two distinct urethane constituents which are blended together. At least one of the urethane constituents is a hybrid of polycarbonate and at least another polyol such as polyether that provides gas-retaining properties. Another urethane constituent is a 100% polycarbonate based polyurethane that provides aging stability. The gas-retaining urethane may be characterized as having high tensile strength at break, high elongation at break, and a 100% modulus in the range of about 800 to about 1,200 PSI. The resulting coating composition (that is, the blend), results in a product that has a higher temperature softening point and at the same time results in a polymer with 100% modulus less than about 1000 PSI. When applied as a single layer to an airbag fabric, the coating results in an airbag with good gas retention and aging stability. Flame retardancy may be incorporated through an additive.

BRIEF DESCRIPTION OF THE DRAWINGS

FIG. 1 is a graph showing the leak-down rates over time of airbags coated with the present coating composition in comparison to the two layer coating system.

DETAILED DESCRIPTION

Urethane Production

In accordance with an exemplary and potentially preferred practice, two different urethane constituents are blended together, preferably in an aqueous dispersion, to produce the present coating composition.

The first urethane is engineered to produce excellent gas-retaining properties and, as such, will be referred to herein as the "gas-retaining urethane." The gas-retaining urethane is characterized as having high tensile strength at break (for instance, at least 2,500 PSI), high elongation at break (for instance, at least 300%), and a 100% modulus of less than about 1200 PSI and more preferably about 800 to about 1200 PSI as measured according to ASTM D882 standards testing technique. By way of example only, one exemplary gas retaining urethane that provides such properties is a hybrid polyurethane formed by using a combination of a polycarbonate and polyether polyol at a 80:20 ratio.

The second urethane is engineered to provide excellent resistance to aging and, as such, will be referred to herein as the "aging stability urethane." In the exemplary practice, the second urethane is synthesized using a 100% polycarbonate polyol and is characterized by a 100% polycarbonate polymer backbone. The aging stability urethane used in this application is characterized as having a 100% modulus less than about 800 PSI; more preferably, in the range of about 400 PSI to about 800 PSI; and, most preferably, about 400 to about 675 PSI. In other words, the resultant polycarbonate polyurethane is softer than the hybrid gas retaining urethane.

The ratio of gas-retaining polyurethane to aging stability polyurethane is preferably in the range of about 80/20 to about 50/50, by weight. In one embodiment, the ratio of gas-retaining polyurethane to aging stability polyurethane is about 63/37. In another potentially preferred embodiment, the ratio of gas-retaining polyurethane to aging stability polyurethane is 60/40. These ratios—each of which includes at least 50% of the gas-retaining polyurethane—provide coating formulations which exhibit a good balance of gas retention and aging stability characteristics.

To produce the desired polyurethanes mentioned above, starting materials, molar ratios and reaction conditions are selected for production of each of the urethane constituents. The starting materials typically include one or more polyols, isocyanate, and chain extenders. The molar ratio of polyol compound(s) to isocyanate compound is preferably on the order of 0.5:1 to 0.98:1.

Preferred polyols for producing a polyurethane include polycarbonate polyols, polyether polyols, silicon-based diols, olefin-based diols, polyester diols, and combinations thereof, the structures thereof being shown below as (I) through (VI). One or more polycarbonate polyols may be used to produce the ageing stability polyurethane constituent for use in the coating composition of the present invention. A single polyol may be used for the gas-retaining polyurethane, although two or more polyols may be used instead. By way of example only, and without limitation, blends of polycarbonate polyol and polyether polyol (e.g., in ratios of from about 80/20 to about 50/50, respectively) may be used to produce a suitable gas-retaining polyurethane compound for use as a constituent in the coating composition of the present invention.

Polycarbonate polyols include compounds having a structure according to structures (I) and (II) below:

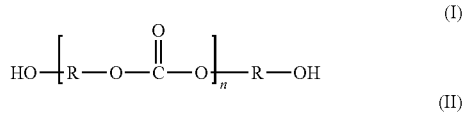

(I)

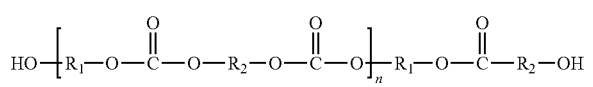

(II)

Where R and $R_1$ are selected from the group consisting of aliphatic radicals and aromatic radicals, where $R_2$ is selected from the group consisting of aliphatic hydrocarbon groups having between 4 to 10 carbon atoms and alicyclic hydrocarbon groups having between 4 to 10 carbon atoms, and n is an integer between 2 and 20. In one embodiment, R is $(C_2)_6$, resulting in a polycarbonate polyol with an average molecular weight ($M_n$) of about 2,000.

Exemplary polyether polyols include compounds having a structure according to structure (III) below:

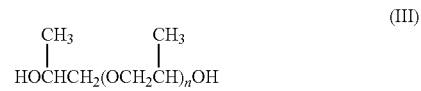

(III)

where n is an integer between 5 and 68. One representative polyether polyol is polypropylene glycol, having a molecular weight ($M_n$) between 400 and 4,000. Also included in this class of polyols are olefin-based diols, which include compounds having a polyethylene, a polypropylene, or a polyolefin copolymer, where the copolymer has a hydroxyl group in a terminal and/or side chain position.

Exemplary silicon-based diols include compounds having a chemical structure according to structure (IV) below:

$$HO—R_1-[—OSiR_2R_3-]—R_4—OH \qquad (IV)$$

where $R_1$ and $R_4$ are independently selected from the group consisting of aromatic and aliphatic radicals and where $R_2$ and $R_3$ are independently selected from the group consisting of methyl radicals, hydroxyl radicals, phenyl radicals, and hydrogen.

Exemplary polyester-based diols include the two compounds whose chemical structures (V) and (VI) are shown below:

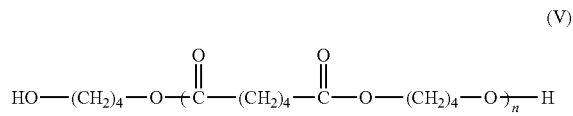

(V)

polybutanediol adipate

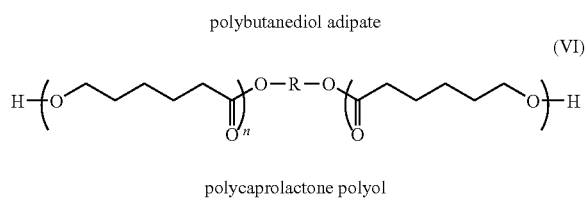

(VI)

polycaprolactone polyol where R is selected from the group consisting of aliphatic hydrocarbon groups having between 2 and 10 carbon atoms and alicyclic hydrocarbon groups having between 2 and 10 carbon groups and where n is an integer chosen to provide a $M_n$, for the polyol of between about 1,000 and about 2,400.

Due to their color stability and heat stability, aliphatic isocyanates may be preferred for reaction with the polyols described above. Suitable aliphatic isocyanates include, but are not limited to, 1,6-hexamethylene diisocyanate (HDI), isophorane diisocyanate (IPDI), hydrogenated methylenediphenyl diisocyanate (HMDI), and α,α,α',α'-tetramethyl-m-xylene diisocyanate (m-TMXDI).

In some circumstances, it may be desirable to use a catalyst to promote the reaction between the polymer diol and the isocyanate compound. Suitable catalysts include tertiary amines, organic tin compounds, and other catalysts known for this purpose.

Typically, water-based polyurethane dispersions are produced using a two-stage synthesis. The first stage involves the manufacture of a moderately low molecular weight, hydrophobic polyurethane oligomer having terminal isocyanate groups. This moderately low molecular weight oligomer is the reaction product of a multifunctional (usually difunctional) isocyanate with polyhydroxy compounds to produce an NH—COO urethane linkage. Such a reaction is shown below, where the polyol and the isocyanate are represented with generic structures. For water-based syntheses, at least one of the polyhydroxy compounds is ionic in nature, typically a dihydroxy organic acid, such as dimethylolpropionic acid (DMPA).

A representative reaction is shown below.

backbone. As shown above, the ionic functionality is due to the presence of carboxylic acid groups. It should also be understood that compounds having sulfuric acid groups ($SO_3H$), in place of the carboxylic acid groups, may instead be used.

By combining one of a large array of polyhydroxy compounds and one of several choices of polyisocyanate compounds, there is the ability to tailor design performance characteristics to meet specific, required parameters, which may range from extremely low modulus with surface tack to low modulus with high tensile strength and elongation to high modulus with high tensile to extremely low elongation and brittleness. In the case of airbag coatings, it is desirable to provide a coating with relatively high tensile strength, high elongation, and low tack.

The isocyanate-terminated polyurethane oligomer, shown above, is typically quite viscous. As a result, a dispersion

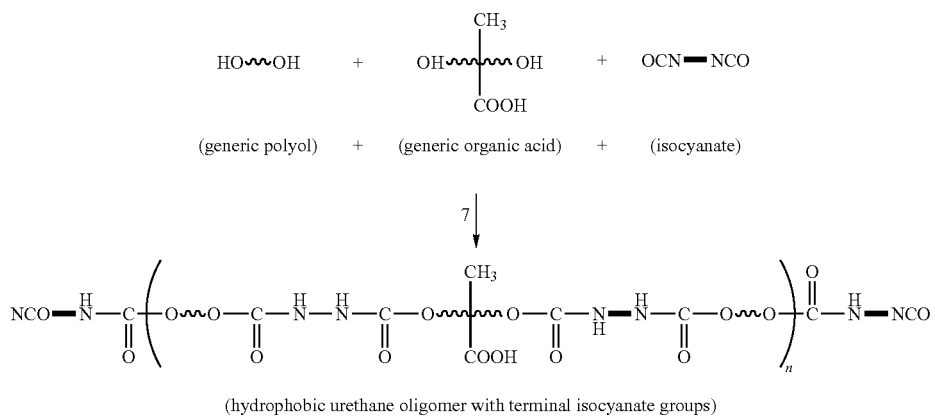

(hydrophobic urethane oligomer with terminal isocyanate groups)

A wide variety of polyhydroxy compounds available for this synthesis reaction leads to the versatility of the polyurethane polymer.

Due to the selective reactivity of the polyisocyanate, the acid functionality of the dihydroxy organic acid compound is extremely slow-reacting, as compared to primary or even secondary hydroxyl groups. This reactivity difference allows the reaction of the hydroxyl groups from the polyols—including the hydroxyl groups from dihydroxy organic acid—with excess polyisocyanate to yield the isocyanate-terminated polyurethane oligomer, shown above, which has a determinable amount of ionic functionality built within the oligomer solvent is needed to dilute the oligomer. Most often, N-methylpyrrolidone (NMP) is used for this purpose.

The second stage of the production of the desired polyurethane compounds involves complexing the ionic functionality, which is present in the hydrophobic (oil-based) oligomer, to create a water-dispersible (hydrophilic) urethane prepolymer. The hydrophilic urethane prepolymer may then be dispersed, under medium shear conditions. Typically, such complexing is achieved by introduction of a base, such as a volatile tertiary amine (represented as $NEt_3$ in the reaction shown below).

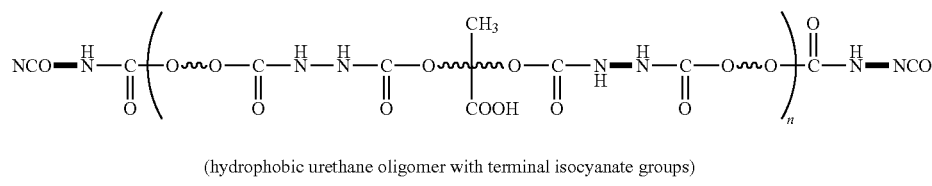

(hydrophobic urethane oligomer with terminal isocyanate groups)

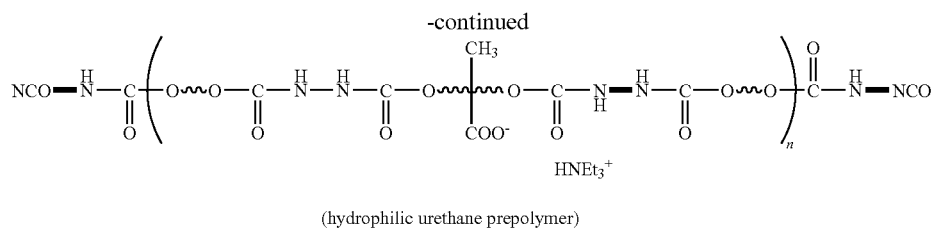

(hydrophilic urethane prepolymer)

Stahl USA, Inc. of Peabody, Mass.; Bayer MaterialScience, LLC of Pittsburgh, Pa.; and Hauthaway Corporation of Lynn, Mass. each manufacture one or more commercially available gas-retaining urethanes, which are suitable for use in the present coating formulations. Additionally, Stahl USA, Inc. Bayer, LLC and Hauthaway Corporation also manufacture commercially available aging stability urethanes incorporated therein.

Additives

Once dispersed, the hydrophilic urethane prepolymers (shown above as the reaction product) are extended with a multifunctional amine compound, which quickly reacts with the terminal isocyanate groups to create polyurea linkages and to promote chain growth. In this manner, the molecular weight of the polyurethane resin is further increased. Multifunctional amine compounds include any organic molecule having at least two primary amine groups, such as ethylenediamine, hexamethylenediamine, hydrazine, and the like. Again, there is significant versatility in the types of amine compounds that may be used for this purpose, as the molecular weight of these compounds ranges from about 32 (for hydrazine) to over 3,000 (for polyetheramines). The amount of amine compound to be introduced is calculated based on the amount of isocyanate present in the hydrophobic urethane compound at the time of dispersion. Most often, the amine compounds are present in an amount of from about 75% to about 95%, by molar ratio, of the isocyanate compounds.

The coating compositions described herein are particularly suitable for coating airbag fabrics and airbags. The coating composition may include one or more of the following optional additives: flame retardants, thickeners, rheology modifiers, anti-blocking agents, colorants or pigments, heat or UV stabilizers, antioxidants, cross-linking agents, adhesion promoters, fillers, synergists for flammability, plasticizers, defoamers and the like. Preferably, rheology modifiers and thickeners are added to adjust the viscosity of the coating formulation to between about 30,000 and about 45,000 centipoise and, more preferably, to between about 35,000 and about 40,000 centipoise.

Synergists

Synergists are compounds that enhance some characteristic of the components of the airbag coating formulations. The desired amount of synergist(s) may be incorporated into the urethane during the chain-extension stage, as the urethane is being dispersed, or may be post-added into the urethane dispersion once the urethane is manufactured.

Some synergists are of the flame retardant variety. Many of these flame retardant synergists do not exhibit significant flame retardant properties when used alone. However, these synergists increase the overall effectiveness of the flame retardant coating composition, even when present in amounts as small as from about 5% to about 10% by weight of the coating composition.

In flame retardant coating formulations, the use of metal oxides as synergists in organohalogen systems is quite common. Of these, three oxides have been found to be especially useful. These are antimony trioxide, antimony pentoxide, and sodium antimonite. Decabromodiphenylethane may also be used as a flame retardant.

Application to Airbag Fabrics

Each of the two polyurethane compounds may be synthesized according to the reactions shown above; converted into its hydrophilic prepolymer; dispersed in water with surfactants, defoamers, and other agents, as necessary or desired; and extended to the desired molecular weight. The two separate dispersions (that is, the gas-retaining polyurethane dispersion and the aging stability polyurethane dispersion) are then blended via shear mixing, to create a blended coating composition. Exemplary ratios of gas-retaining to aging stability polyurethane and amounts of optional additives are described in later examples.

The coating composition, incorporating the two urethane components and additives, is then applied to an airbag fabric by any known coating methods including floating knife coating, knife-over-roll coating, spray coating, impregnation coating, curtain coating, reverse roll coating, transfer roll coating, and screen coating. The coating is then dried at a temperature in the range of 260° F. to 320° F. and, more preferably, at a temperature of about 300° F. for about two minutes. The add-on weight of the coating composition, when dry, is preferably between 0.5 oz/yd$^2$ and 1.5 oz/yd$^2$; more preferably, is less than 1.0 oz/yd$^2$ (or 34 g/m$^2$); and, in some embodiments, may be less than 0.6 oz/yd$^2$ (or 20 g/m$^2$).

Because the coating composition is applied as a single, monolithic layer, manufacturing is significantly simplified. Rather than applying a first coating layer, drying it, applying a second layer, and drying it, the present compositions require a single application pass and a single drying pass. Also, the technical challenge in developing and maintaining interlayer adhesion between the functional groups of each layers is not necessary with this invention.

However, the use of the present coating compositions in a monolithic layer does not preclude the separate application of an anti-blocking agent (such as spray talc), if desired, as such applications are not considered a separate, or second, coating layer.

Example 1

An airbag coating composition to be used as a monolithic layer was prepared using commercially available urethanes in a dry blend ratio of 80:20 gas-retaining urethane to aging stability urethane. The components of the coating composition are provided below.

| Component | % Solids | Parts (Dry) |
|---|---|---|
| Gas-retaining urethane | 40 | 63:00 |
| Aging Stability urethane | 40 | 37.00 |
| Flame retardant | 60 | 15.00 |
| Rheology modifier | 25 | 1.8 |
| Pigment | 60 | 0.0180 |

The finished coating composition had a viscosity of approximately 40,000 centipoise and was readily spreadable via floating knife coater. The coating composition was applied, using a floating knife coater, in a single layer to both outer sides of a one-piece Jacquard woven side curtain-type airbag. The airbag had a 50×50 construction and used 420 denier nylon 6,6 yarns in both the warp and fill directions. Nylon 6, polyester or combination of polyamide and polyester yarns can also be used as a fabric substrate.

The coated bag was then dried in an oven at a temperature of about 300° F. for about 2 minutes. The dry add-on weight of the coating composition (on each side of the airbag) was about 0.5 oz/yd$^2$ or 17 g/m$^2$.

Example 2

Comparative

A comparative Example was created in which two different coating layers were applied sequentially to an airbag fabric. The components of the various coating layers are shown below.

Layer 1:
Fabric-Contacting Layer

| Component | % Solids | Parts (Dry) |
|---|---|---|
| Gas-retaining urethane | 40 | 80.00 |
| Acrylic polymer | 60 | 20.00 |
| Rheology modifier | 25 | 1.8 |
| Pigment | 60 | 0.0180 |

The fabric-contacting coating composition was applied, using a floating knife coater, in a single layer to both outer sides of a one-piece Jacquard woven side curtain-type airbag. The airbag had a 50×50 construction and used 420 denier nylon 6,6 yarns in both the warp and fill directions.

The coated fabric was then dried in an oven at a temperature of about 300° F. for about 2 minutes. The dry add-on weight of the first layer (on each side of the airbag) was about 0.5 oz/yd$^2$ or 17 g/m$^2$.

Layer 2:
Top-Coat Layer

| Component | % Solids | Parts (Dry) |
|---|---|---|
| Silicone Component "Part A" | 100 | 50.00 |
| Silicone Component "Part B" | 100 | 50.00 |

The top-coat layer composition was applied, using a floating knife coater, over the fabric-contacting layer. The coated fabric was then dried a second time in an oven at a temperature of about 360° F. for about 1.5 minutes. The dry add-on weight of the second layer (on each side of the airbag) was about 1.0 oz/yd$^2$ or 34 g/m$^2$. The coated airbag fabric was then lightly sprayed with talc to prevent blocking.

Evaluation of Examples

Examples 1 and 2 were evaluated for a variety of properties, the results of such analyses being shown below. Where appropriate, standard test methods are listed in parentheses following the test descriptions.

| Description (Test Method) | Units | Example 1 | Example 2 |
|---|---|---|---|
| Weave Count—Warp (ISO7211/2 Method C) | Per 25.4 mm | 51.1 | 52.3 |
| Weave Count—Fill (ISO7211/2 Method C) | Per 25.4 mm | 50.0 | 50.3 |
| Total Weight A (ASTM D-3776C) | oz/yd$^2$ | 6.67 | 7.6 |
| Coating Add-on "A" Side | g/m$^2$ | 15.9 | 51.2 |
| Total Weight B (ASTM D-3776C) | oz/yd$^2$ | 6.67 | 7.6 |
| Coating Add-on "B" Side | g/m$^2$ | 16.0 | 49.6 |
| Tensile—Warp (ASTM D-5034) | N | 2521 | 2540 |
| Tensile—Fill (ASTM D-5034) | N | 2762 | 2654 |
| Elongation—Warp (ASTM D-5034) | % | 41.56 | 45.8 |
| Elongation—Fill (ASTM D-5034) | N | 42.0 | 48.2 |
| Joint Tensile—Warp (ASTM D-1683) | N | 1523 | 1474 |
| Joint Tensile—Fill (ASTM D-1683) | N | 1459 | 1466 |
| Tongue Tear Strength—Warp (ASTM D-2261) | N | 141 | 180 |
| Tongue Tear Strength—Fill (ASTM D-2251) | N | 158 | 206 |
| Flammability—Warp (FMVSS 302) | Pass/Fail | Pass | Pass |
| Flammability—Fill (FMVSS 302) | Pass/Fail | Pass | Pass |
| Stiffness/Circular Bend—Warp (ASTM D-4032) | N | 12.0 | 11.6 |
| Stiffness/Circular Bend—Fill (ASTM D-4032) | N | 12.0 | 11.0 |

These results indicate that the monolithic coating composition of the present disclosure performs equally well as the standard, two-layer coating composition, in terms of flammability and tensile strength.

As described previously, gas retention is important in protecting a vehicle's occupants from injury, especially in the event of a vehicle rollover. Gas retention is measured by inflating an airbag (in this case, a side-curtain, one-piece woven airbag) to a peak pressure of 70 kPa and then recording the pressure retention as a function of time. The time for deflation was measured and has been plotted in FIG. 1. FIG. 1 shows the gas retention rates for two airbags of the same starting construction (materials, size, shape, and volume), which were coated with the formulation of Example 1 and 2. The combination of the two urethanes in Example 1 displayed virtually no loss in gas retention. The single layer coating performed as well as a two layer coating despite at being at a substantially lower coat weight.

Next in the evaluation phase was to measure the performance of the gas retention properties after subjecting the airbags to various aging conditions. The results are set forth in Table 1 below.

TABLE 1

|  | 70 kPa Start | | Burst |
|---|---|---|---|
|  | kPa @ 6 sec. | kPa @ 12 sec. | Pressure kPa |
| AR 1 | 53.6 | 42.4 | 199 |
| AR 2 | 57.9 | 49.6 | 190 |
| AR 3 | 54.9 | 48.6 | 193 |
| AR 4 | 56.8 | 49.7 | 194 |
| Average | 55.8 | 47.6 | 194.0 |
| 105C HA 1 | 614 | 554 | 192 |
| 105C HA 2 | 605 | 542 | 193 |
| 105C HA 3 | 613 | 565 | 182 |
| 105C HA 4 | 634 | 597 | 193 |
| Average | 61.7 | 56.5 | 190.0 |
| 70C RH 1 | 571 | 485 | 193 |
| 70C RH 2 | 554 | 456 | 196 |
| 70C RH 3 | 529 | 421 | 195 |
| 70C RH 4 | 54 | 44 | 198 |
| Average | 54.9 | 45.1 | 195.5 |
| CYC 1 | 545 | 487 | 198 |
| CYC 2 | 583 | 499 | 199 |
| CYC 3 | 565 | 472 | 202 |
| CYC 4 | 575 | 485 | 196 |
| Average | 56.7 | 48.6 | 198.8 |

A first set of four airbags were tested immediately after production, namely in "As Received" state (as indicated in Table. 1 by the label "AR"). A second set of airbags was subjected to environmental testing by heat-aging the coated airbags at 105° C. for 400 hrs (as indicated in Table. 1 by the label "105C HA"). A third set of airbags was subjected to environmental testing by subjecting the coated airbags to a temperature of 70° C. and 95% relative humidity for 400 hrs (as indicated in Table. 1 by the label "70C RH"). A fourth set airbags was subjected to environmental testing by subjecting the coated airbags to a cycle aging for 400 hrs (as indicated in Table. 1 by the label "CYC").

As shown in Table 1, the elimination of the second (top) coating layer from the airbag coating system had no effect on the airbags coated with the present coating system. Even after vigorous environmental testing, the gas-retaining properties of the present coating system are not significantly reduced. The gas-retaining properties remain substantially the same (and in an acceptable range) as the "As Received" sample. Another crucial property that was monitored with this inventive coating was the structural integrity of the airbag itself after being subjected to the above aging conditions. The last column in Table 1. represents the burst pressure of the cushions in as received state and after aging, again the elimination of the second (top) coating layer from the airbag coating system had no effect on the airbags coated with the present coating system. This is an important property that is indicative of any loss in the structural strength of the airbag.

Another test used to evaluate Examples 1 and 2 is called a "blocking test," which indicates the force required to separate two portions of coated fabric from one another after prolonged storage in contact with each other (such as an airbag is stored) This test was conducted in accordance with Test Method SAE J912, entitled "Test Method for Determining Blocking Resistance and Associated Characteristics of Automotive Trim Materials." The test method is designed to indicate the degree of surface tackiness, color transfer, loss of embossment, and surface marring when two materials are placed face-to-face under specific conditions of time, temperature, and pressure.

Laboratory analysis for blocking entails cutting two 50 mm×75 mm swatches of airbag fabric, pressing a 50 mm×50 mm area under a 5 lb. (22 N) load at 100° C. for 48 hours, and allowing a 25 mm×50 mm end flap to remain without exposure to temperature or pressure. At the end of the testing period, the 22 N-load is removed and a 50-gram mass is attached to the end flap on the lower fabric swatch. The time required for the two coated swatches to peel apart completely is recorded. If the time required to separate the fabrics utilizing a 50-gram weight suspended from the bottom fabric layer is greater than 30 seconds, the coating system fails the blocking test.

Clearly, the lower the required separating shear force, the more favorable the coating. In traditional airbag coating systems (such as that of Example 2), to improve blocking resistance and thus reduce the chance of improper adhesion between the packed fabric portions, anti-blocking agents (such as talc, silica, silicate clays, and starch powders) may be applied to the coated fabric. Application of anti-blocking agents does not fall outside this invention as such application are not considered as a second coating layer.

| Sample Identification | Separation Time |
|---|---|
| Example 1 | Instant Separation/Immediate |
| Example 2 (Comparative) | Instant Separation/Immediate |

Thus, the single-layer, urethane-based coating system of Example 1 performed as well as the two-layer system of Example 2.

As demonstrated above and as described herein, the present single-layer coating systems described herein provide excellent gas retention, anti-blocking characteristics, flame retardance, and aging stability, making them advancements over previously developed coating systems that require two coating layers to achieve these properties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of making a coated airbag, said method comprising the steps of: (a) providing an airbag; (b) providing a coating composition, said coating composition comprising (i) a gas-retaining urethane characterized by a tensile strength at break of at least 2,500 psi, and a 100% modulus less than 1,200 psi, and (ii) a aging stability urethane containing polycarbonate backbone; (c) applying said coating composition to at least a portion of said airbag in a single layer; and (d) drying said coating composition.

2. The method of claim 1, wherein said airbag is a one-piece Jacquard woven airbag.

3. The method of claim 1, wherein said airbag is a sewn airbag.

4. The method of claim 1, wherein the application of said coating composition in step (c) is accomplished by a technique selected from the group consisting of floating knife coating, knife-over-roll coating, spray coating, impregnation coating, curtain coating, reverse roll coating, transfer roll coating, and screen coating.

5. The method of claim 1, wherein step (d) occurs at temperatures between 260° F. and 320° F.

6. The method of claim 1, wherein the dry add-on weight of said monolithic coating layer is from about 0.5 oz/yd$^2$ to about 1.5 oz/yd$^2$.

* * * * *